July 26, 1938. F. F. T. FLINT 2,124,735
FLUID PRESSURE MOTOR
Filed May 20, 1935  3 Sheets-Sheet 1

INVENTOR.
FORREST FLOYD T. FLINT.
BY
ATTORNEY.

July 26, 1938.   F. F. T. FLINT   2,124,735
FLUID PRESSURE MOTOR
Filed May 20, 1935   3 Sheets-Sheet 2
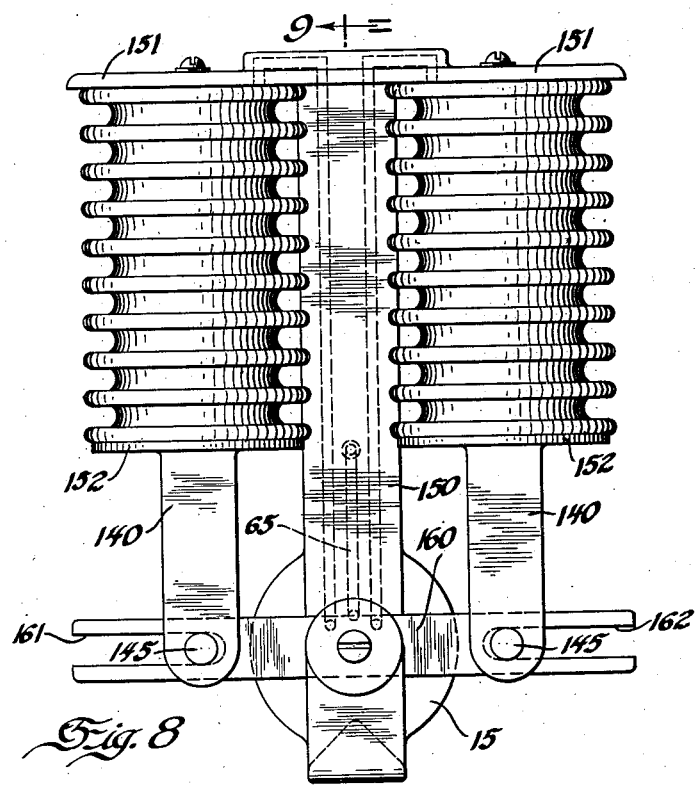
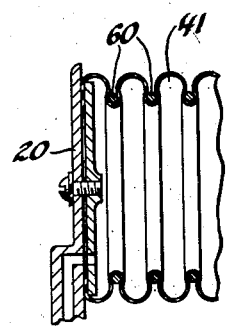
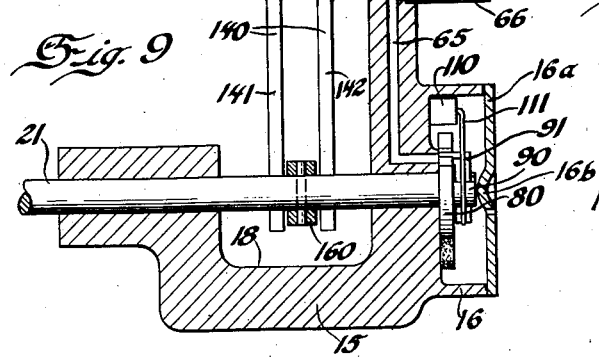
INVENTOR.
FORREST FLOYD T. FLINT.
BY
ATTORNEY.

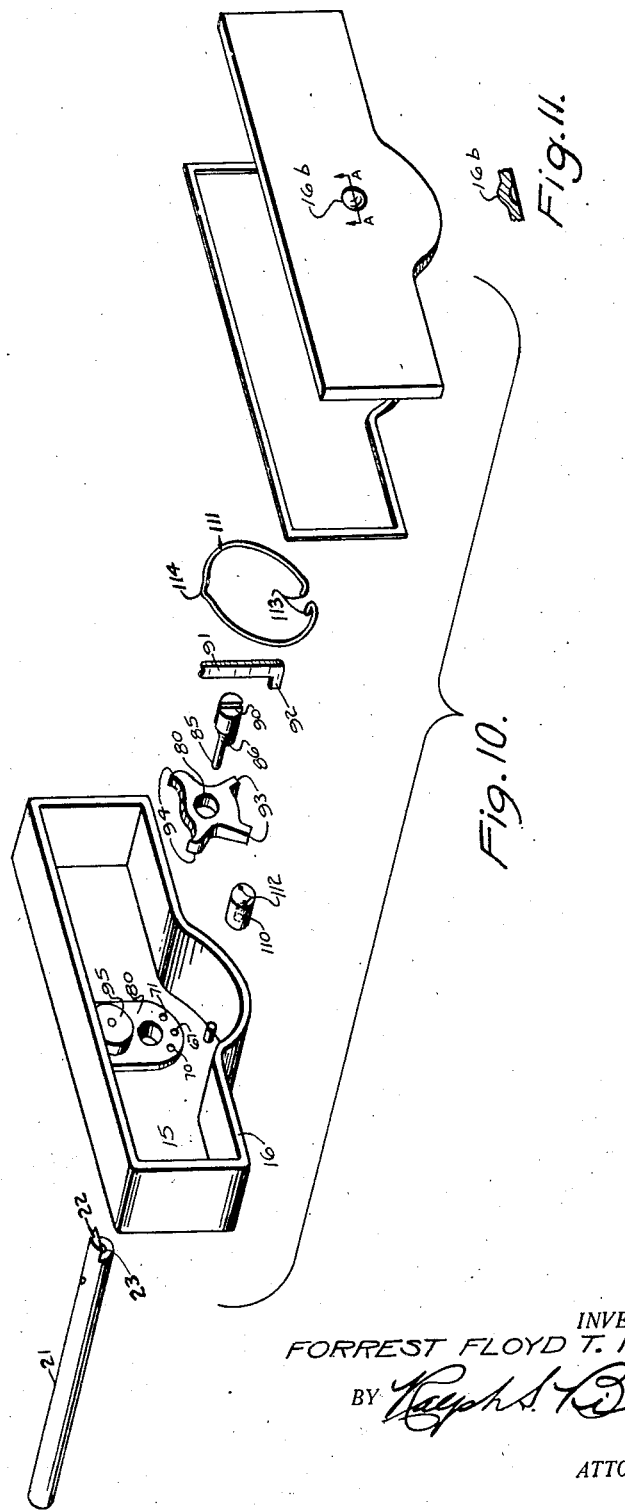

Patented July 26, 1938

2,124,735

UNITED STATES PATENT OFFICE 2,124,735

FLUID PRESSURE MOTOR

Forrest Floyd T. Flint, Detroit, Mich., assignor, by direct and mesne assignments, to Automotive Devices Incorporated, a corporation of Michigan Application May 20, 1935, Serial No. 22,457

4 Claims. (Cl. 121—48)

This invention relates to fluid pressure motors adapted for use particularly where the differential pressure is very slight. The invention finds its greatest use in the field of the so called "suction" type motor, operating on the differential pressure between that of the atmosphere and that of the lower pressure obtained by causing a partial vacuum, such as is created in the intake manifold of an internal combustion engine.

The main object of this invention is to provide a fluid pressure operated motor in which the fluid cannot leak around any moving part inasmuch as reciprocating or oscillating pistons having relative movement to their cylinder walls are entirely eliminated.

Another object of the invention is to provide a fluid pressure motor capable of developing a maximum amount of power as compared with the area of the differential fluid pressure surfaces employed and which is nevertheless cheap to manufacture.

Another object of the invention is the provision of an improved valve actuating mechanism which is simplified in construction, efficient in operation, and cheap to manufacture.

These and other objects and advantages will become apparent from the following description taken in conjunction with the accompanying drawings, wherein:

Fig. 7 is a fractional detail view in cross section showing a portion of a collapsible tube provided with exterior reinforcing rings.

Fig. 8 is a side elevational view of another embodiment of my invention.

Fig. 9 is a transverse view partly in section taken on line 9—9 of Figure 8.

Fig. 10 is an exploded view of the valve mechanism and its housing.

Fig. 11 is a sectional detail view taken on line A—A of Fig. 10.

Figure 1:
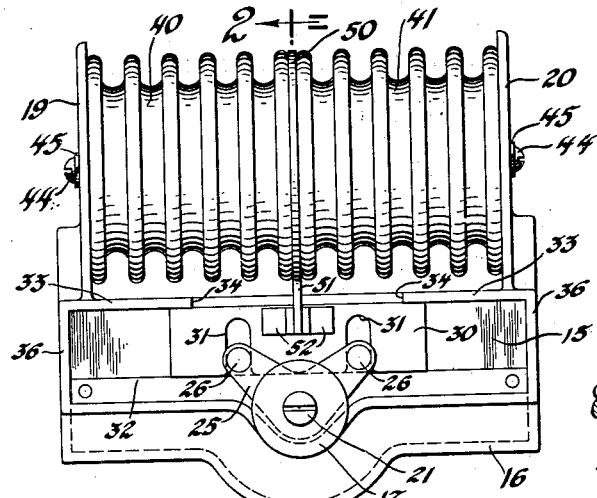
Fig. 1 is a side elevational view of one form of fluid pressure motor embodying my invention, with the cover plate, which normally encloses the chamber in which the rack member reciprocates, removed.

Dealing first with the preferred embodiment of my invention, shown in Figures 1-5 inclusive, the motor includes a casting, designated generally by the numeral 15 and having a chamber-forming flange 16 which cooperates with a cover plate 16a in forming a valve chamber V. Said casting is also provided with an outwardly projecting bearing or shaft-engaging portion 17 and with a recessed portion 18, the latter accommodating the shaft-actuating pinion and the reciprocating rack member hereafter to be described. At the opposite ends, as viewed in Figs. 1 and 2, the casting is provided with upwardly extending portions 19 and 20 for supporting the collapsible and expansible working chambers or bellows hereafter to be described.

The motor shaft 21 extends through the portion 17 of the casting 15 and is provided with a reduced portion 22 extending partially into the valve chamber V for purposes hereafter to be described.

The shaft is oscillated by a V-shaped pinion member 25, suitably secured thereto in any convenient manner, and which is mounted in the depressed portion 18 of casting 15. Each arm of said pinion member 25 is provided with a pin 26 projecting therefrom at right angles thereto, said pins being actuated by a reciprocating rack member 30. The rack member has a pair of spaced grooves 31, each adapted to accommodate and to actuate one of the pins 26 in the usual manner. The reciprocating rack member 30 is mounted in the upper part of said recessed portion 18 of the casting 15 in any suitable manner. I have shown the same supported on and slidable upon a shoulder 32.

The casting is also provided with a flange portion 33 acting as an upper guide member for the rack member 30 and said flange 33 is cut away to form an opening 34 to accommodate the member that actuates the rack member 30. A cover plate 35 is mounted upon the bearing portion 17 and abuts against side walls 36 and flange 33 to substantially close the chamber in which the rack member and associated parts operate.

I provide a pair of collapsible tubes 40 and 41, having a series of convolutions or folds of successive large diameter portions and smaller diameter portions. These tubes may be constructed of metal, preferably of corrugated resilient metal such as brass, or they may be made of rubber or the like. When made of rubber they must be reinforced in some suitable manner and I have found the best reinforcement to consist in a set of rings used as hereinafter described.

I secure one end of each tube to one of the upwardly extending portions 19 and 20 respectively in any suitable manner so as to prevent leakage of fluid around the joint. I prefer to secure the tubes to said projecting supporting side walls 19 and 20 in the manner illustrated in Fig. 3 of the drawings, which consists of providing perforated discs, 42 and 43 respectively, folding the ends of the respective tubes over said respective discs and securing the discs to the respective members 19 and 20 so as to impinge the ends of said tubes therebetween by any suitable means such, for instance, as by means of the screws 44 and sealing washers 45.

The movable ends of said tubes may be closed in any suitable manner and connected to an arm for actuating the rack member 30. To accomplish this I prefer to utilize a central disc 50 having an extending and depending arm 51 which is secured to the rack 30 by any suitable means, such as by angle irons 52, and to close the movable ends of the tubes with two additional discs 55 and 56 which I secure to said central disc. I fold the respective movable end portions of the tubes over said respective discs 55 and 56 and secure said three discs together so as to clamp or squeeze the ends of the respective tubes between their respective discs and the central disc to form a seal, securing the three discs together in any suitable manner such as by means of the screw 57, nut 58 and sealing washer 59.

In this manner I form two contractible and expansible working chambers which are adapted to reciprocate disc 50, arm 51 and rack 30, thus actuating pinion member 25 and oscillating shaft 21.

Figure 3:
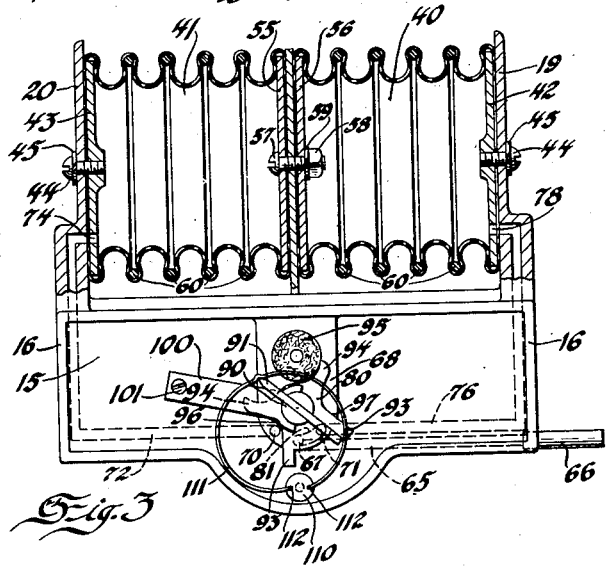
Fig. 3 is a view in elevation of the side opposite that shown in Figure 1, and being partly broken away, showing a sectional elevational view of the collapsible tube or bellows and their supporting and associated parts.

When the tubes are made of rubber and are to be used in the so-called "suction" type motor, a ring 60 is placed inside of each large diameter convolution of the tubes as shown in Fig. 3. When the tubes are made of rubber and are to be used with fluid pressure in excess of atmospheric pressure, one of said rings is placed on the outside of said tube in each small diameter groove or convolution as shown in Fig. 7.

The casting 15 is provided with an exhaust passage 65, having a suitable connecting pipe 66 at one end, adapted for connection with any suitable suction-creating or pressure creating means. Said passage 65 terminates at the other end in an exhaust port 67, located in a portion of the casting surrounding the shaft 21 which is preferably offset from the innermost portion of the valve chamber V and acts as the valve seat 68.

On each side of the exhaust port 67 and opening through said valve seat is a chamber-communicating port, designated respectively 70 and 71. Port 70 communicates with the contractible and extensible chamber formed in tube 41 by means of a passage 72 and dual-service port 74 in disc 43. Port 71 communicates with the contractible and extensible chamber formed by tube 40 through a passage 76 and dual-service port 78 in disc 42. If the tubes are cemented or otherwise secured to the supporting walls 19 and 20 respectively, the respective ends of passages 72 and 76 would serve as the respective dual-service ports 74 and 78.

Mounted on the reduced portion 22 of shaft 21 is a disc valve 80, said valve being provided with a port connecting groove or passage 81. This groove or passage 81 is adapted to register with exhaust port 67 at all times and to connect the said exhaust port with either one of the two chamber communicating ports 70 and 71 between which it is interposed.

The valve 80 is provided with a central bore 82 of diameter sufficient to accommodate the shaft 21. Thus, as the reduced portion of the shaft 22 is made to accommodate less than half the area of the bore 82 of valve 80, the remaining space is free to accommodate a portion of the valve-actuating means hereafter to be described.

Figure 5:
Fig. 5 is a detail view taken on line 5—5 of Figure 4, showing a cross section of the motor shaft and a cross section of a portion of the pivot arm of the valve trip mechanism.

The end of the large diameter portion of shaft 21, adjacent reduced portion 22, is provided with a partial bore or recess 23, and a valve shifter pivot pin 85 extends through valve 80 and into said recess or bore 23 of the shaft 21 in such manner as to permit partial oscillation of the shaft without oscillating said pin. A portion of the valve shifter pin 85 beneath reduced portion 22 of shaft 21 is provided with a depending lug 86 of general triangular outline, in cross section, as shown in Fig. 5, presenting two inclined faces 87 and 88 respectively. The reduced portion of the shaft 22 presents substantially two shoulders 22a and 22b, shoulder 22a being adapted to contact face 87 of lug 86 when the shaft rocks to the left as viewed in Fig. 5, and shoulder 22b being adapted to contact face 88 of lug 86 when the shaft rocks to the right as viewed in said Fig. 5, thus permitting considerable movement of the shaft before the latter will move the lug 86 and its pin 85.

The portion of the valve shifter pin 85 which projects into the valve chamber V, beyond the valve, is provided with an enlarged slotted head 90 in which is mounted a valve shifter lever 91, the latter having, on the lower end, an offset lug or valve kicker lug 92 which is adapted to contact spaced valve-actuating shoulders 93 projecting from the lower portion of disc valve 80.

Projecting from the upper end of said valve disc are spaced extending arms 94 and centrally mounted above said valve disc is a cushioned stop member 95 against which one of said spaced extending arms 94 is adapted to contact for stopping the valve at each end of its stroke. The valve disc is provided with two spaced recessed portions 96 and 97 respectively, so spaced that when the valve connects exhaust port 67 with port 71, port 70 will be uncovered by the valve and vice versa.

In order to hold valve 80 tightly against its seat 68, any suitable means may be employed such as a leaf spring 100, one end of which I secure to the casting, as by screw 101, in such manner that the leaf spring will extend over the disc valve 80 and will permit valve shifter lever 91 to pass thereover.

Pivotally mounted in said valve chamber, on the casting and beneath the valve is a spring support 110 in which the ends of a spring 111 of general circular outline are mounted, the spring support having openings 112, one on each side of the pivot point, adapted to receive bent portions 113 of said spring 111.

Figure 4:
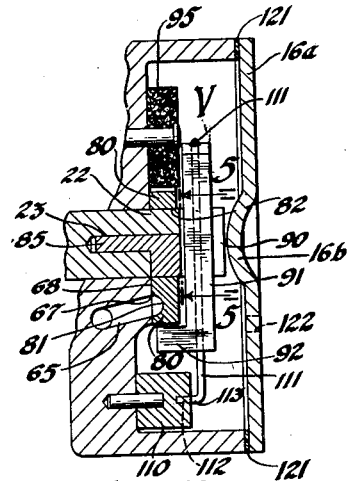
Fig. 4 is an enlarged sectional view of the control mechanism shown in Figures 2 and 3, taken on substantially the same line as Figure 2, viz., 2—2 of Figure 1, but showing the valve kicker and associated parts in a different position.

The mid-portion of said spring 111 is bent into a V-shaped portion to form a seat 114 for the upper arm of valve shifter lever 91, the latter preferably being tapered as shown to fit therein and having a groove 115, see Fig. 4, to receive the spring and to aid in keeping said lever arm and the spring seat together.

When the motor is used with pressures greater than that of atmosphere, a sealing gasket 121, of any suitable sealing material, is provided between the periphery of the valve casing and the valve chamber cover plate. Said cover plate is also provided with a pressure or atmospheric inlet port 122.

When the device operates as a so-called "suction" type motor, the gasket 121 may be omitted, and the port 122 may also be omitted if the cover plate is not sealed tightly enough to the valve casing to exclude the passage of air.

Figure 6:
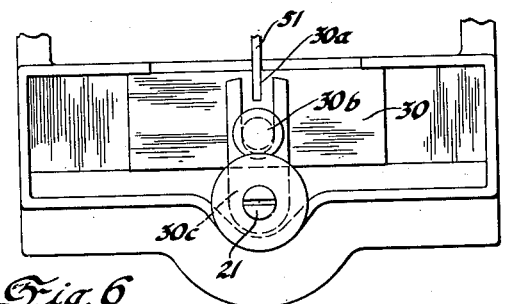
Fig. 6 is a fractional side elevational view showing another form of motion translatory means which may be utilized with the working chambers disclosed in Figures 1 and 2.

In the modified structure shown in Fig. 6, the rack 30 is of somewhat different form and is provided with a slot 30a which is adapted to receive the arm 51 of disc 50. The rack in this form is provided with a pin 30b, and, in lieu of the pinion 25 shown in Fig. 1, I provide a U-shaped member 30c and rigidly secure it to the shaft 21. The pin 30b is adapted to reciprocate in the groove or middle portion of said U-shaped member, and, as the rack member 30 reciprocates, it carries the pin 30b with it, and said reciprocation of pin 30b causes the U-shaped member 30c to turn or oscillate and consequently oscillates shaft 21.

In Figs. 8 and 9 I have shown another modification of my invention in which a pair of expansible and contractible chambers have their moving ends provided with extending arms 140, each arm comprising a pair of spaced members 141 and 142 respectively.

In this modification the casting 15 has an upwardly extending portion 150 provided with a flanged chamber-supporting member 151 of sufficient width to accommodate a pair of spaced collapsible working chambers of the type hereinbefore described, said chambers being formed with collapsible tubes having one end of each tube secured to said supporting flange 151 in the manner heretofore described and each of their moveable ends are closed and secured to end members 152 in a similar manner. The end members 152 may be secured to the aforesaid arms 140 in any suitable manner or they may be made integral therewith.

In this modification the recessed portion 18 of casting 15 is somewhat larger in order to accommodate the arms 140 and a walking beam 160 which is rigidly secured to the shaft in any suitable manner. The respective ends of said walking beam 160 are provided with horizontal slots 161 and 162, one at each end, and the members 141 and 142 of the respective arms 140 straddle the walking beam 160 and are united by respective pins 145 passing therethrough and through the respective slots, the pins being slideable in said slots. Thus, it will be seen that when one of the working chambers collapses or partially contracts and the other extends, the walking beam will be rocked and the shaft 21 will be oscillated.

The valve mechanism in this modification is the same as that shown in Figs. 1–5 inclusive, save that they are reversed in position, i. e., upside-down.

Figure 2:
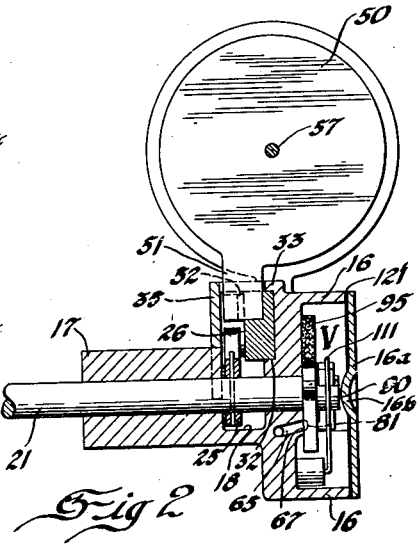
Fig. 2 is a transverse sectional view taken on line 2—2 of Figure 1.

The upwardly extending portion 150 of the casting 15 is provided with passages 72 and 76 communicating with the valve chamber and with the upper ends of the collapsible chambers in the same manner as shown in Fig. 2.

In order to prevent undue longitudinal movement of the valve shifter pivot pin 85 in the bore 23, any suitable bearing surface may be provided on the inside of the cover plate 16a for engaging the enlarged head 99 of said pin. For this purpose I prefer to stamp out the cover plate with a bearing portion 16b, as shown.

Having now fully described my invention, I do not desire to be limited to the exact structures shown.

I claim:

1. In a snap-acting control mechanism an oscillatory shaft a control lever to be actuated in accordance with the movements of said shaft, means for pivotally supporting said lever for movement to either of two positions, biasing means for snapping said lever quickly between its positions comprising a spring of substantially circular conformation surrounding said lever, means for pivotally anchoring the ends of said spring, an intermediate deformed portion on said spring providing a seat for operatively engaging one end of the valve shifter lever to continuously apply a biasing tension thereon, and means for operating said snap-acting mechanism.

2. In a snap-acting valve control mechanism an oscillatory shaft, a valve shifter control lever to be actuated to valve engaging positions in accordance with the movements of said shaft, means for pivotally supporting said lever for movement to either of two positions, actuating means providing a slack motion connection between said shaft and said lever, biasing means for snapping said valve shifter quickly between its valve engaging positions comprising a spring of substantially circular conformation surrounding said lever, means for anchoring the ends of said spring, and an intermediate deformed portion of said spring providing a seat for operatively engaging one end of the enclosed valve shifting lever to continuously apply biasing tension thereon.

3. A snap acting valve mechanism comprising an oscillatory shaft having a projecting shoulder, an oscillatory valve, oscillatory valve kicker means pivotally mounted on said shaft and having a lug portion presenting two faces and effecting a loose connection with said shoulder and adapted to be actuated thereby to either of two positions, thereby causing the movement of the valve, a spring of substantially circular conformation surrounding a portion of said kicker means adapted to quickly snap said lever from one to the other of its positions after the shoulder of the shaft has first moved said lever beyond dead center and adapted to hold it there until the shoulder of the shaft moves said lever in the opposite direction and means for pivotally anchoring the ends of said spring.

4. A snap acting valve mechanism comprising an oscillatory shaft having a projecting shoulder, an oscillatory valve, an oscillatory valve control lever mounted on said shaft and adapted to actuate said valve, means having a loose connection with and adapted to be actuated by said shoulder of the shaft for causing the initial movement of said lever in each direction of its oscillation between two positions, a spring of substantially circular conformation surrounding said lever adapted to quickly snap said lever from one to the other of its positions after the shoulder of the shaft has first contacted the lever actuatable means and thereby moved said lever beyond dead center and adapted to hold it there until the shoulder of the shaft again contacts said lever actuatable means and moves said lever in the opposite direction and means for pivotally anchoring the ends of said spring.

FORREST FLOYD T. FLINT.